(12) United States Patent
Huessler et al.

(10) Patent No.: US 6,588,968 B2
(45) Date of Patent: Jul. 8, 2003

(54) APPARATUS FOR RELEASABLY INTERCONNECTING STRUCTURAL COMPONENTS OF ROTATIONAL SYMMETRY

(75) Inventors: Walter Huessler, Stuhr (DE); Gerd Gloyer, Ganderkesee (DE)

(73) Assignee: Astrium GmbH, Ottobrunn (DE)

( * ) Notice: Subject to any disclaimer, the term of this patent is extended or adjusted under 35 U.S.C. 154(b) by 0 days.

(21) Appl. No.: 09/801,174

(22) Filed: Mar. 5, 2001

(65) Prior Publication Data

US 2003/0099510 A1 May 29, 2003

(30) Foreign Application Priority Data

Jul. 7, 2000 (DE) ......................................... 100 33 093

(51) Int. Cl.⁷ .................................................. F16B 2/08
(52) U.S. Cl. ........................ 403/223; 403/291; 403/373; 403/398; 403/DIG. 4; 403/DIG. 7; 403/DIG. 9; 403/DIG. 14
(58) Field of Search ............................. 403/373, 374.2, 403/374.3, 374.5, 398, DIG. 4, DIG. 7, DIG. 9, DIG. 14, 223, 220, 291

(56) References Cited

U.S. PATENT DOCUMENTS

| 3,908,933 | A | * | 9/1975 | Goss et al. ................. 244/3.21 |
| 4,128,921 | A | | 12/1978 | Heinze et al. ................. 24/279 |
| 4,198,114 | A | * | 4/1980 | Zapp ............................ 350/36 |
| 5,136,946 | A | * | 8/1992 | Becker ........................ 101/410 |
| 5,157,816 | A | | 10/1992 | Huessler .................... 24/279 X |

FOREIGN PATENT DOCUMENTS

| DE | 2655772 | 6/1978 |
| DE | 3727448 | 3/1989 |

* cited by examiner

*Primary Examiner*—Christopher J. Novosad
(74) *Attorney, Agent, or Firm*—W. G. Fasse; W. G. Fasse

(57) ABSTRACT

Two structural components are releasably connected to each other by a clamping mechanism (CM) which engages two interface rings (9, 10) secured to the respective structural component. The clamping mechanism is formed by tensioning elements (5) held together by at least one, preferably two tensioning members such as straps (1, 2). A lock (15) with two hinged tensioning levers (18, 19) hinged at (21) to a mounting (17), holds the tensioning strap or straps releasably together. For this purpose each strap end is journalled by a journal bolt (3, 4) to the respective tensioning lever (18, 19). Locking elements (25, 26, 28, 30) hold the tensioning levers (18, 19) in a locked position. An electromagnetic drive or the like is used to unlock the tension levers for releasing the tensioning strap or straps in a controlled manner without completely opening the ring formed by the clamping mechanism. The position of the journal bolt (3, 4) relative to its tensioning lever (18, 19) is adjustable by an adjustment screw (22).

14 Claims, 3 Drawing Sheets

APPARATUS FOR RELEASABLY INTERCONNECTING STRUCTURAL COMPONENTS OF ROTATIONAL SYMMETRY

PRIORITY CLAIM

This application is based on and claims the priority under 35 U.S.C. §119 of German Patent Application 100 33 093.2, filed on Jul. 7, 2000, the entire disclosure of which is incorporated herein by reference.

FIELD OF THE INVENTION

The invention relates to a clamping mechanism for releasably interconnecting structural components having a rotational symmetry such as cylindrical or conical bodies, for example for connecting a payload to a carrier rocket. The clamping mechanism forms a tensioning ring which must be capable of releasing one structural component from the other structural component without completely opening the ring.

BACKGROUND INFORMATION

Clamping devices that surround the components to be releasably interconnected are known in the art. Hose clamps come to mind. These clamps surround the components in a clamping or tensioning plane. Certain of such devices comprise clamping elements arranged along the radially inwardly facing side or inside of a tensioning member. The clamping elements have a radially inward facing contour, that cooperates with a respective radially outward facing flange type contour of the structural components to be interconnected. At least one tensioning member in the form of a strap, belt, tape or cable is provided with one eye at each end. A journal bolt passes through one eye and connects the respective strap end to a tensioning device. A further journal bolt passes through the other eye and is also connected to the tensioning device. When the tensioning device is operated to tension the tensioning member the two journal bolts move toward each other thereby tensioning the tensioning member around the two components whereby the two components are releasably interconnected. The tensioning device conventionally separates the ends of the tensioning member completely from each other.

German patent publication DE 37 27 448 C2 describes a tensioning device as described above. Such a tensioning device is particularly used in space technology in order to connect a payload to an end stage of a carrier rocket. When the target orbit is reached the payload is separated and released from the carrier rocket by opening the tensioning device to thereby completely open the device.

German patent publication DE-OS 26 55 772 describes another tensioning device useful for the above mentioned purposes of separating a payload from a carrier rocket. The tensioning device is known as a "Marmans" tensioning connector. Just as in the first mentioned conventional tensioning device, the "Marman" tensioning connector is also provided with clamping elements on the inner surface of a tensioning belt or strap. The tensioning devices are provided on their radially inwardly facing surface with conical recesses which cooperate with correspondingly shaped flanges of interface rings of the structural components to be interconnected. These flanges of the interface rings are secured to the end sections of the structural components to be is interconnected. The tensioning device holds the ends of the tensioning strap together when the two structural components are interconnected. The clamping elements are separated or pulled off by a pyrotechnically controlled explosion whereby the structural components separate from one another, for example a payload is separated from the carrier rocket end stage.

Even though the explosion is pyrotechnically controlled, it is unavoidable that the sudden separation of the tensioning member suddenly releases a high tension energy that was stored in the tensioning member such as a strap. As a result, under certain circumstances it is possible that a relatively strong shock load is applied to neighboring components and systems of the rocket and/or the payload.

OBJECTS OF THE INVENTION

In view of the foregoing it is the aim of the invention to achieve the following objects singly or in combination:

to construct a tensioning assembly for a strapping apparatus or clamping mechanism of the type described above in such a way that the drawback of a sudden tension release is avoided when the tensioning assembly of the strapping apparatus is opened or released;

to assure that a trouble-free, constant, uniform radially inwardly directed clamping tension is applied along the entire circumference of the structural components to be interconnected;

to construct the tensioning assembly in such a way that a controlled radial opening notion which increases the diameter of the tensioning member is achieved without completely opening the clamping mechanism;

to release the tension in the tensioning member, such as a strap, and in the tensioning assembly gradually and without completely separating the ends of the tensioning member from each other; and to construct the tensioning assembly in such a manner that a controlled radially directed opening motion of one or more tensioning straps is assured.

SUMMARY OF THE INVENTION

The above objects have been achieved in the strapping apparatus also referred to as clamping mechanism according to the invention in that the ends of one or two tensioning members such as straps, belts, tapes or cables are interconnected by at least one tensioning assembly that includes two tensioning levers and a locking mechanism. Each tensioning assembly has two spaced and hinged tensioning levers which carry journal bolts passing through eyes at each end of the tensioning member or members. Preferably an end of each tensioning lever is hinged to a fixed point on a mounting provided in common for both spaced and hinged tensioning levers. Locking elements of a locking mechanism are provided on the common mounting for locking the spaced and hinged tensioning levers in their tensioned position. The two spaced and hinged tensioning levers are tilted toward each other for applying tension to the tensioning member to thereby interlock the two structural components. The spaced and hinged tensioning levers are tilted away from each other to open the strapping apparatus. Several tensioning assemblies and locking mechanisms may be distributed around the circumference of the strapping apparatus.

When the present strapping apparatus is opened by tilting the spaced and hinged tensioning levers around their separate hinges and away from each other, a clamping ring formed by the tensioning member, by the tensioning assembly and by the locking mechanism is merely enlarged in its diameter without completely separating the ends of the tensioning member. As a result, opening the present clamping ring first transforms the stored energy of the closed status into motion energy and then into elastic energy which is taken up by the tensioning member and is not imposed on neighboring structural components. The length of the opening motion of the present strapping apparatus can be reduced by distributing several belt clamps around the circumference of the circular clamping plane of the structural components. Such belt clamps limit the motion of the tensioning member or members, especially the radially outwardly directed opening motion thereof. These belt clamps locally control the strapping apparatus so that a sudden jumping of the strap ends is avoided.

BRIEF DESCRIPTION OF THE DRAWINGS

In order that the invention may be clearly understood, it will now be described by way of example, with reference to the accompanying drawings, wherein.

DETAILED DESCRIPTION OF PREFERRED EXAMPLE EMBODIMENTS AND OF THE BEST MODE OF THE INVENTION

Figure 1:
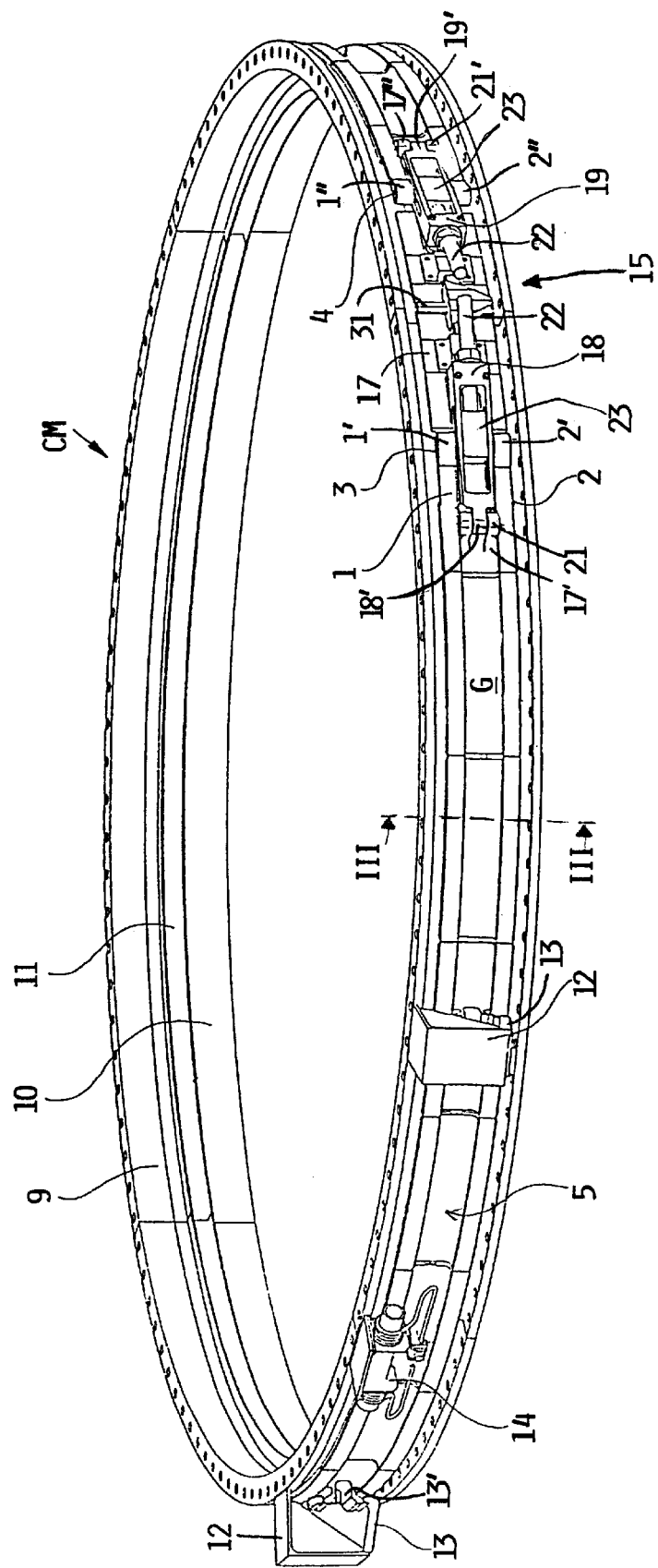
FIG. 1 is a perspective view of the present strapping apparatus or clamping mechanism in its closed state showing two tensioning straps held together by a single tensioning assembly that includes a locking mechanism and a mounting with two spaced and hinged tensioning levers pointing toward each other.

The perspective view of FIG. 1 shows the clamping mechanism CM according to the invention as a permanently closed ring that is formed of a plurality of clamping elements 5 circumferentially distributed around the ring shown in a locked condition. The diameter of the permanently closed ring can be reduced for locking and increased for unlocking. The clamping mechanism CM is also referred to as "strapping apparatus". The clamping elements 5 are held together in this embodiment by two tensioning members 1, 2 such as straps, tapes, belts or cables which are spaced from each other in the vertical or axial direction. The axial direction is defined by the central longitudinal system axis of the structural components to be releasably interconnected. The strap 1 has an eye 1' at one end and an eye 1" at the other strap end. The strap 2 has an eye 2' at one end and an eye 2" at the other strap end. A journal bolt 3 passes through the eyes 1' and 2' at one end of the two straps 1 and 2 arranged and parallel to each other. A further journal bolt 4 passes through the respective eyes 1" and 2" at the other end of the two straps 1 and 2. These journal bolts 3 and 4 operatively connect the strap ends or eyes to a respective tensioning lever 18 and 19 to form a ring structure as will be described in more detail below. The journal bolts 3 and 4 extend in parallel to each other and in parallel to a ring structure central longitudinal axis which coincides with the system axis mentioned above. The system axis is also the rotational axis of interface rings 9 and 10 also shown in FIG. 3 which are conventionally secured to the structural components to be interconnected. These structural components are not shown in the present drawings. These structural components are of a rotational symmetry, particularly they have a cylindrical or conical configuration.

Figure 3:
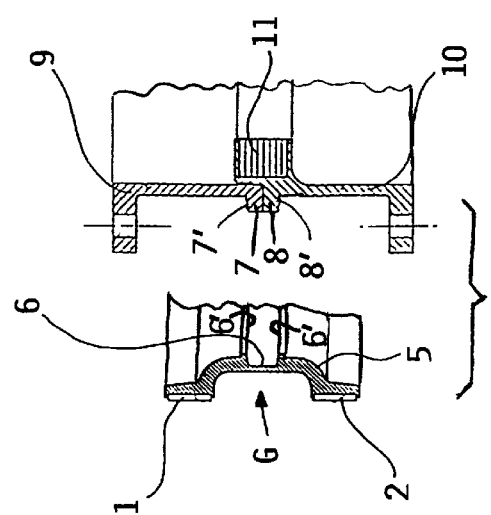
FIG. 3 shows a sectional view along section line 3—3 in FIG. 1 whereby a clamping element is shown radially spaced from interface rings of structural components to be releasably interconnected.

All of the clamping elements 5 that are facing radially inwardly from the tensioning members 1 and 2 are of identical construction. FIG. 3 shows a section through a clamping element and through the interface rings 9 and 10. Each clamping element 5 has a flat ring surface preferably two flat ring surfaces facing radially outwardly and into contact with the tensioning members such as straps 1 and 2. Each clamping element 5 also has an outwardly facing contoured groove G and a radially inwardly facing contour forming a clamping channel 6 having preferably slanted conical walls 6' facing each other across the clamping channel 6. The interface ring 9 has a flange 7 with a conical surface 7'. The interface ring 10 has a flange 8 with a conical surface 8'. These conical surfaces 7' and 8 ' fit into the channel 6 when the straps 1 and 2 are tightened by the tensioning levers 18, 19 of the tensioning assembly which also includes a mounting 17, and a locking mechanism 15 or 16, see also FIG. 2, for maintaining the two structural components clamped together. One of the interface rings 9 or 10 is provided with a radially inwardly facing reinforcing ring 11. As shown, the ring 11 is part of the interface ring 10. Assuming the ring 10 is secured to the end stage of the carrier rocket, the ring 11 will provide a stop flange for the insertion of the payload into the ring 9.

Referring further to FIG. 1, the tensioning members such as straps 1 and 2 are held properly spaced from one another in the axial direction by belt clamps 12 having a spring biased arm 13 that engages with its bent tree end a hook 13' secured to at least certain of the clamping elements 5. A so-called pull off spring mechanism 14 is part of at least one of the straps 1 or 2, for example strap 1. The spring mechanism 14 facilitates the pull off of the strap from the ring structure.

Figure 2:
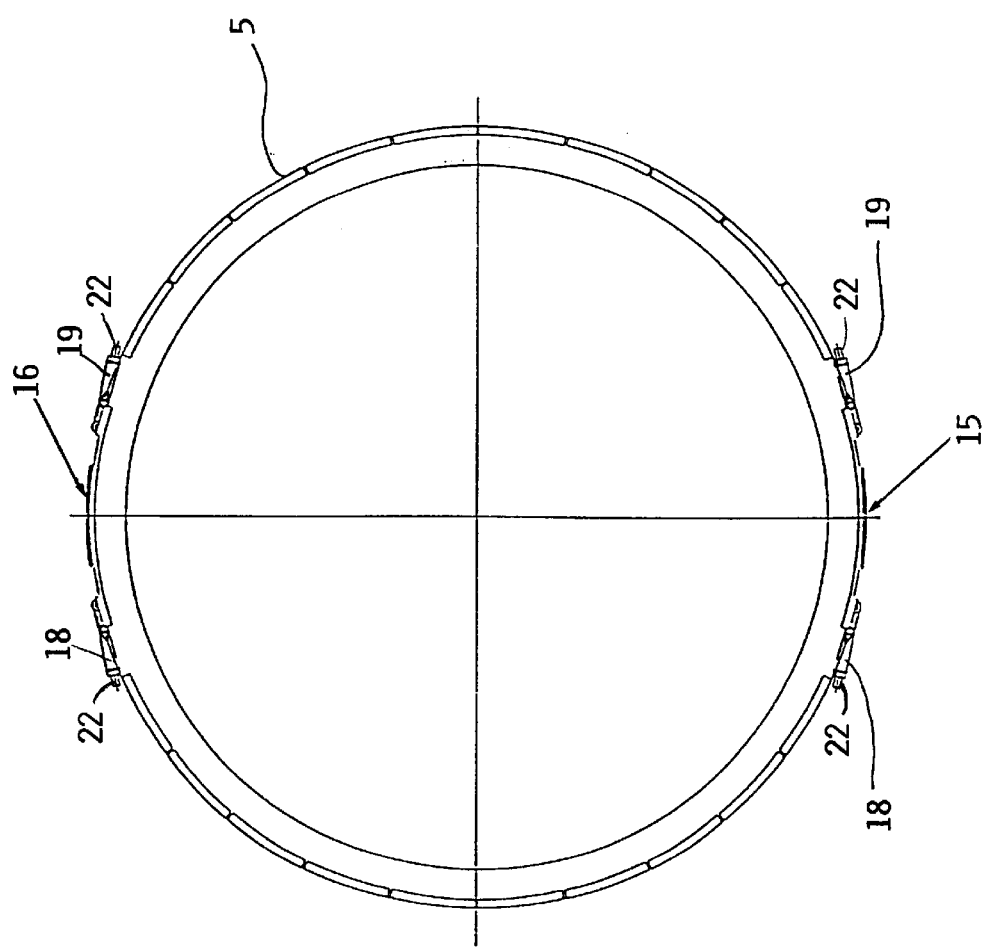
FIG. 2 is a top plan view of an embodiment of the present clamping mechanism in its open state, wherein the two spaced and hinged tensioning levers point away from each other.
Figure 4:
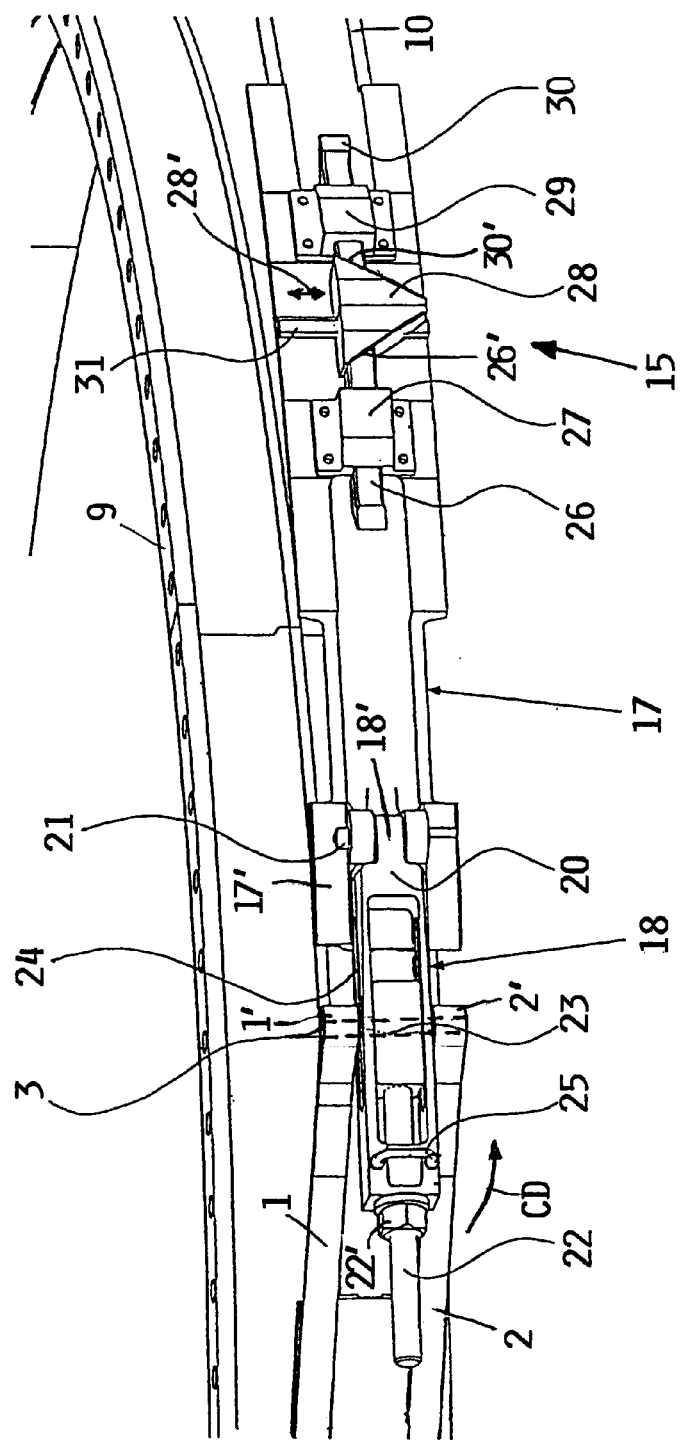
FIG. 4 is a perspective view similar to that of FIG. 1, however on an enlarged scale and showing the tensioning assembly with one of its two tensioning levers, its mounting and with its locking mechanism in its open state, only the left hand tensioning lever and central locking bar arrangement are shown while the right hand tensioning lever is not shown.

Referring to FIGS. 1 and 4 in conjunction, each of the journal bolts 3 and 4 is journalled in a respective tensioning lever 18, 19 of the tensioning assembly that includes the locking mechanism 15 or 16 for locking the tensioning levers in a tensioned position. The locking mechanism 16 shown in FIG. 2 is of identical construction as the locking mechanism 15. Therefore only one of these locking mechanisms will be described in detail. Each tensioning assembly with its locking mechanism 15 or 16 comprises a common base plate or mounting 17 carrying two hinge blocks 17' and 17" as seen in FIG. 1. The mounting 17 has a curvature and radially inwardly facing contour fitting into the radially outwardly facing groove or contour G formed in the clamping elements 5 shown in FIG. 3, whereby the mounting 17 helps spacing the straps 1 and 2 from each other. The mounting 17 and its hinge blocks 17', 17" also fit between the axial end flanges of the interface rings 9, 10. The above mentioned two tensioning levers 18 and 19 are spaced from each other and hinged to the hinge blocks 17' and 17", respectively. A hinge pin 21 hinges a first end 18' of the tensioning lever 18 to the hinge block 17'. A second hinge pin 21' hinges a first end 19' of the tensioning lever 19 to the hinge block 17". The mounting 17, the tensioning levers 18 and 19, the locking mechanism 15, the hinge blocks 17', 17"

and the hinge pins 21, 21' form together the main components of the tensioning assembly.

Referring particularly to FIG. 4, both eyes 1' and 2' of the tensioning straps 1 and 2 are journaled to the tensioning lever 18 by the same journal bolt 3. Referring to FIG. 1, the eyes 1" and 2" at the opposite ends of the straps 1, 2 are journaled to the tensioning lever 19 by the same journal bolt 4. The tensioning levers 18 and 19 are spaced from each other along the mounting 17 and are preferably constructed as so called quick action tensioning levers. Only the tensioning lever 18 will be described in detail. The tensioning lever 19 is of the same mirror symmetrical construction relative to the lever 18. Each tensioning lever 18, 19 includes a rectangular frame 20 hinged by the hinge pins 21, 21' to the hinge blocks 17', 17" as mentioned above. The hinge blocks 17' and 17" are fixed to the mounting 17 as shown in FIGS. 1 and 4. The journal bolts 3 and 4 extend in parallel to the hinge pins 21 and 21'. The journal bolts 3, 4 and the hinge pins 21, 21' extend in parallel to the central system axis.

The opposite, free end of each tensioning lever 18, 19 is provided with a threading in which a tensioning screw 22 is received. An unthreaded end of the tensioning screw 22 extends out of the frame 20 as shown in FIGS. 1, 2 and 4. The threading is of sufficient length along the tensioning screw to accommodate a counter nut 22' which locks the tensioning screw 22 relative to the frame 20 in an adjusted position. The inner end of the tensioning screw 22 is rotatably secured to a guide block 23 for adjusting the position of the guide block 23 lengthwise within the frame 20 of the tensioning lever 18. The frame 20 has in its upwardly and downwardly facing frame sections elongated holes 24 through which the journal bolt 3 extends into and through the guide block 23 which is slidable in the frame 20 in response to operating the tensioning screw 22. Further the ends of the journal bolt 3, 4 stick out upwardly and downwardly of the frame 20 into the respective eyes 1' and 2', and 1" and 2", respectively. The outer end of the frame 20 carries a locking bail 25 the function of which will be described below. When the counter nut 22' is loosened the position of the guide block 23 shown in FIG. 4 can be adjusted within the frame 20 to tension the straps 1 and 2 since the journal pins 3, 4 pass through the guide block 23. The journal pins 3, 4 are enabled to move back and forth along the elongated guide holes 24 when the guide block 23 moves back and forth in the frame 20 in response to an adjustment of the screw 22.

As best seen in FIG. 4, the locking bail 25 is constructed for cooperating with a locking bar 26 that is part of the locking mechanism 15, 16. The locking bar 26 is slidably mounted in a support 27 secured to the base plate or mounting 17. The sliding motion of the locking bar 26 extends in the direction circumferentially around the clamping mechanism CM. This applies also to the locking bar 30 which cooperates with a respective bail of the tensioning lever 19 not shown in FIG. 4. Both ends of each locking bar 26 and 30 extend out of their respective supports 27 and 29 which are secured to the mounting 17. The locking bar 26 has a ramp shaped end surface 26'. Similarly the locking bar 30 has a ramp shaped end surface 30'. While the lever facing end of the locking bar 26 engages the bail 25 the opposite ramp shaped end 26' cooperates with a slanting surface of a wedge 28 that functions as a mechanical safety device for locking and unlocking the clamping mechanism CM. The ramp surface 30' of the other locking bar 30 cooperates with the same wedge 28. The wedge 28 is movable up and down as indicated by the arrow 28' guided by a guide bar 31 that extends in parallel to the central longitudinal axis of the clamping mechanism CM.

The construction of the tensioning levers 18 and 19 and of the locking bars 26 and 30 is mirror-symmetrical relative to a plane passing longitudinally through the guide bar 31 of the wedge 28.

In its open state with the tensioning levers 18, 19 in the position pointing away from each other as shown in FIG. 2, the present clamping mechanism fits over the flanges 7, 8 of the ring sections 9, 10 without the need for completely separating the ends of the straps 1 and 2. The clamping mechanism is closed or tensioned by tilting the lever 18 in the direction CD about the hinge pin 21 as shown in FIG. 4 and tilting the lever 19 in the opposite direction about the hinge pin 21' to bring the clamping mechanism CM from the open, large diameter position shown in FIG. 4 into the closed smaller diameter position shown in FIG. 1. Thus, a biasing clamping force is applied to the tensioning straps 1 and 2 to cause a radially inward displacement of the clamping elements 5 by the tensioning levers 18 and 19 through the tensioning straps 1 and 2 when the tensioning levers are moved toward each other to perform a first tensioning step. A final tensioning adjustment by the threaded screws 22 is substantially reduced in its length by moving both tensioning levers 18 and 19 toward each other as shown in FIG. 1. For applying a final tensioning force in a second tensioning step the tensioning screws 22 are turned when the tensioning levers 18, 19 are in the closed position and when the counter nut 22' is loose to bring the guide block 23 and thus the journal bolt 3, 4 into the final tensioned position. In the final tensioned position the counter nut 22' is tightened again.

When the tensioning levers 18 and 19 are in the position shown in FIG. 1 pointing toward each other the bail 25 of the tensioning lever 18 is engaged by the hook end of the locking bar 26 and the respective bail of the tensioning lever 19 is engaged by the hook of the locking bar 30 to keep the tensioning levers 18 and 19 in the locked position.

An unintended opening of the present clamping mechanism CM is prevented according to the invention by the above mentioned mechanical safety device in the form of the wedge 28 when the wedge is in its upper position along the guide rail 31. When the clamping mechanism CM is to be opened intentionally, the wedge 28 is forced downwardly thereby moving the locking bars 26 and 30 slightly away from each other for disengagement from the respective locking bails 25. The movement of the wedge 28 downwardly in the opening direction is for example accomplished by an electro magnetic drive not shown. However other drives for moving the wedge 28 downwardly may be employed.

The ramp shaped end surface 26' of the locking bar 26 and the ramp shaped end surface 30' of the locking bar 30 cause a controlled opening of the system in a timed relationship so that a slow opening and a respectively delayed release of the tensioning energy is assured. The delayed release is further enhanced by the friction in the entire system. This friction in combination with the mass inertia forces of the tensioning and locking components and of the tensioning straps supports the controlled timed sequence of the opening or tension release operation, whereby the straps 1, 2 cannot jump in an uncontrolled manner.

The clamping mechanism CM according to the invention as described above has a simplified construction that provides more functions than are conventionally available. The opening of the present clamping mechanism CM is accomplished by rotating the tensioning levers 18 and 19 from the closed state position shown in FIG. 1 to the open state position shown in FIG. 2, whereby the clamping elements 5 merely move slightly apart and the entire system including the tensioning levers 18 and 19, the mounting 17 and the straps 1 and 2 still form a "closed" ring even in the open state. During the opening motions the tension energy stored in the system is first converted into a motion energy and then again into an elastic energy of the straps. The belt clamps 12 with their spring biased arm 13 and the pull off spring mechanism 14 serve during the opening or rather during the enlargement of the diameter of the ring, for locally limiting the motion of the clamping elements 5 forming the ring so that a controlled radial motion component of the clamping elements 5 is enforced and the entire tensioning ring system is locally fixed.

The tensioning straps 1 and 2 described above for the example embodiment may be replaced by other tensioning elements such as tapes, belts or cables. Any of these tensioning elements optimize the surface pressure of the contact surface area between the clamping elements 5 and the interface rings 9 and 10. More specifically a uniform pressure distribution is achieved around the entire circumference of the cooperating ring surfaces. Such a uniform pressure distribution results in a uniform radial load distribution through the clamping elements 5 onto the conical surfaces 7' and 8' due to the uniform contacting around the entire circumference of the just mentioned surfaces. The spacing, if any, between neighboring clamping elements 5 in the circumferential direction is uniform all around the interface rings 9, 10.

By selecting the proper length of the tensioning straps 1 and 2 and by arranging the required number of clamping elements 5 and tensioning assemblies around the circumference of the structural components it is possible according to the invention to construct the present clamping mechanism CM for practically any required diameter of the interface rings 9 and 10 or their flanges 7 and 8. Even structural components with very large diameters can be safely and releasably interconnected by the present clamping mechanism thereby avoiding the problem that conventional clamping mechanisms could not accommodate very large diameter components. Heretofore it was necessary to use more complicated and particularly heavier connection mechanisms. According to the invention a further advantage is achieved in that the calculations of the required strength values of the present clamping system do not need to take into account any bending moments at the interface rings 8 an 9 because such bending moments are avoided. The present clamping elements 5 with their groove 6 uniformly engage the slanted, conical surfaces 7', 8' of the interface rings 9 and 10. This engagement of the flanges 7 and 8 in the groove 6 of the clamping elements 5 provides a system having a high load carrying capability whereby this capability is substantially limited only by the material strength of the interface rings 9 and 10 specifically their flanges 7 and 8.

As mentioned above it is possible to use but one locking mechanism 15 or 16 around the circumference. However, for larger diameter structural components several such locking mechanisms 15 and 16 may be distributed around the circumference of the respective interface rings of the structural components to be interconnected.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A clamping mechanism (CM) for releasably interconnecting two structural components (9, 10) having radially outwardly reaching clamping surfaces (7', 8') of rotational symmetry, said clamping mechanism comprising a plurality of clamping elements (5), at least one tensioning member (1) holding said clamping elements together, said clamping elements (5) comprising a radially inwardly facing clamping groove (6) adapted for cooperation with said clamping surfaces (7', 8') of said structural components, said at least one tensioning member (1) comprising a first end and a second end, a first connecting eye (1') secured to said first end, a second connecting eye (1") secured to said second end of said at least one tensioning member, and a tensioning assembly comprising a mounting (17), spaced first and second tensioning levers (18, 19), two separate hinges (21, 21'), each hinge operatively securing one of said spaced first and second tensioning levers (18, 19) to said mounting (17) for performing a first tensioning step, a locking mechanism (15) secured to said mounting (17) between said spaced first and second tensioning levers (18, 19) for locking said spaced first and second tensioning levers in a tensioned position, said first tensioning lever (18) comprising a first guide, a first journal bolt (3) securing said first connecting eye (1') to said first tensioning lever (18) in said first guide for movement relative to said first tensioning lever, said second tensioning lever (19) comprising a second guide, a second journal bolt (4) securing said second connecting eye (1") to said second tensioning lever (19) in said second guide for movement relative to said second tensioning lever, and first and second tensioning screws (22) as part of said first and second tensioning levers for adjusting the position of said first and second journal bolts (3, 4) respectively relative to said first and second tensioning levers (18, 19) for performing a second tensioning step.

2. The clamping mechanism of claim 1, wherein said mounting (17) comprises spaced hinge supports (17', 17") for each of said two separate hinges, said mounting (17) further comprising a radially inwardly facing first contour matching a radially outwardly facing second contour (G) of said clamping elements (5), said first contour of said mounting (17) having a curvature fitting a curvature of a said second contour (G).

3. The clamping mechanism of claim 1, wherein each of said spaced first and second tensioning levers (18, 19) comprises a locking bail (25), and wherein said locking mechanism (15) comprises two locking bars (26, 30), one locking bar cooperating with each locking bail (25), and two supports (27, 29) secured to said mounting (17), each support slidably holding a respective locking bar (26, 30) of said two locking bars (26, 30).

4. The clamping mechanism of claim 3, wherein said locking mechanism (15) further comprises a wedge (28) movably secured on said mounting (17) between said two supports (27, 29), a guide rail (31) on said mounting (17) for guiding a sliding motion of said wedge (28) relative to said locking bars (26, 30), and wherein each of said locking bars (26, 30) has a ramp shaped end surface (26', 30') for cooperation with a respective slanting surface of said wedge (28) for locking and unlocking said locking bars (26, 30) depending on a position of said wedge (28) relative to said locking bars (26, 30).

5. The clamping mechanism of claim 1, comprising a plurality of tensioning members arranged in sequence for surrounding said structural components, and a respective plurality of said tensioning assemblies distributed circumferentially and connecting said first mentioned plurality of tensioning members to each other to form a closed ring having a variable diameter.

6. The clamping mechanism of claim 1, comprising two tensioning members (1, 2) arranged in parallel to and spaced from each other to form a gap between said two tensioning members, said mounting (17) being positioned at least partly in said gap between said two tensioning members (1, 2), each of said two tensioning members (1, 2) comprising two of said connecting eyes (1', 1"; 2' 2") with one connecting eye positioned at each end of each tensioning member of said two tensioning members, and wherein each of said first and second journal bolts (3, 4) passes through one connecting eye of each of said two tensioning members (1, 2), so that said two spaced first and second tensioning levers (18, 19) are positioned at least partly between said at least two tensioning member (1, 2) for simultaneously tensioning said two tensioning members in said first tensioning step.

7. The clamping mechanism of claim 6, wherein said two tensioning members (1, 2) define a clamping plane of rotational symmetry around said structural components (9, 10), and wherein each of said two separate hinges comprises a respective hinge pin (21, 21') having a hinging axes extending in said clamping plane.

8. The clamping mechanism of claim 6, wherein said tensioning assembly interconnects said two ends of each said two tensioning members in such a way that a circumferentially closed unit is formed of said two tensioning members and of said locking mechanism (15) interconnecting said first and second tensioning levers when said locking mechanism is locked and when said locking mechanism is unlocked.

9. The clamping mechanism of claim 1, wherein each of said first and second tensioning levers (18, 19) comprises a lever frame (20) comprising frame sections interconnecting first and second lever ends, said frame sections forming said first and second guides as a respective guide channel between said lever ends in said lever frame (20), each guide channel (24) guiding one of said first and second journal bolts (3, 4).

10. The clamping mechanism of claim 9, further comprising two guide blocks (23), one guide block being slidably received in each said guide channel, and wherein each of said first and second journal bolts (3, 4) is connected to a respective guide block of said two guide blocks, whereby said journal bolts (3, 4) are movable with said respective guide block relative to said lever frame (20) and thus relative to said tensioning levers (18, 19), along a respective guide channel (24).

11. The clamping mechanism of claim 10, wherein each of said first and second tensioning screws (22) passes through a threaded hole in said second lever end into said guide channel, each of said tensioning screws having an inner end rotatably connected to a respective guide block (23) of said two guide blocks (23) for shifting said respective guide block (23) and a respective journal bolt (3, 4) along said guide channel (24) in said lever frame (20).

12. The clamping mechanism of claim 11, further comprising a counter nut (22') on said tensioning screw, said counter nut bearing against said lever frame (20) when said counter nut is tightened to hold said tensioning screw and said respective guide block in an adjusted position.

13. The clamping mechanism of claim 1, wherein said mounting (17) comprises a hinge block (17', 17") for each of said two separate hinges, a hinge pin (21, 21') connecting each of a first lever end (18', 19') to said hinge block for tilting movement of said tensioning lever (18, 19).

14. An apparatus for releasably interconnecting two structural components (9, 10) having radially outwardly reaching clamping surfaces (7', 8') of rotational symmetry, said apparatus comprising a plurality of clamping elements (5), at least two tensioning members (1, 2) holding said clamping elements (5) together, said clamping elements (5) comprising a radially inwardly facing clamping groove (6) adapted for cooperation with said clamping surfaces (7', 8') of said structural components, each of said at least two tensioning members comprising two connecting eyes (1', 1"; 2', 2"), wherein one eye is secured to each end of each of said two tensioning members (1, 2), a first journal bolt (3) passing through a first pair of said eyes (1', 2')of each tensioning member, a second journal bolt (4) passing through a second pair of said eyes (1", 2") of each tensioning member, a mounting (17) at least one locking mechanism (15) secured to said mounting and interconnecting said journal bolts (3, 4) for moving said journal bolts closer to each other in a clamping operation, said at least one locking mechanism (15) comprising two tensioning levers (18, 19), two separate hinges with hinge pins (21) securing said tensioning levers (18, 19) to a respective fixed point of said mounting (17), said journal bolts (3, 4) connecting said ends of said two tensioning members to a respective tensioning lever (18, 19) of said two tensioning levers (18, 19), said locking mechanism comprising locking elements (25, 26, 28, 30) for locking said tensioning levers (18, 19) in a tensioning position, each of said tensioning levers (18, 19) further comprising an adjustment mechanism (20, 22, 23, 24; 32) connected to a respective journal bolt (3, 4) for adjusting the position of said respective journal bolt relative to said respective tensioning lever for applying a further tensioning force to said respective tensioning lever following movement of said respective tensioning lever into said tensioning position.

* * * * *